US008189863B1

(12) United States Patent
Rucklidge

(10) Patent No.: US 8,189,863 B1
(45) Date of Patent: *May 29, 2012

(54) WATERMARKING DIGITAL DOCUMENTS

(75) Inventor: William J. Rucklidge, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/245,784

(22) Filed: Sep. 26, 2011

Related U.S. Application Data

(63) Continuation of application No. 13/080,517, filed on Apr. 5, 2011.

(51) Int. Cl.
*G06K 9/00* (2006.01)

(52) U.S. Cl. ............ 382/100; 382/232; 380/51; 380/54; 713/176

(58) Field of Classification Search .................. 382/100, 382/232; 380/51, 54; 713/176
See application file for complete search history.

(56) References Cited

U.S. PATENT DOCUMENTS

| 7,287,163 B2 * | 10/2007 | Ogino ........................... 713/176 |
| 2003/0081779 A1 * | 5/2003 | Ogino ........................... 380/207 |
| 2006/0239201 A1 * | 10/2006 | Metzger et al. ............... 370/252 |
| 2006/0239501 A1 * | 10/2006 | Petrovic et al. .............. 382/100 |
| 2007/0201099 A1 * | 8/2007 | Eguchi et al. ................ 358/3.28 |
| 2007/0300073 A1 * | 12/2007 | Moskowitz ................... 713/176 |
| 2008/0052516 A1 * | 2/2008 | Tachibana et al. ............ 713/176 |
| 2009/0202103 A1 * | 8/2009 | Fujii et al. .................... 382/100 |
| 2010/0064140 A1 * | 3/2010 | Moskowitz ................... 713/176 |

* cited by examiner

*Primary Examiner* — Aaron W Carter
(74) *Attorney, Agent, or Firm* — Fenwick & West LLP

(57) ABSTRACT

A watermark is embedded in a document having a plurality of pages. The pages of the document are analyzed to produce watermark information, which indicates whether the page is suitable for use with one or more of a plurality of watermarking schemes. The plurality of watermarking schemes may include page element shifting, flyspecking and text warping. An identifier (ID) is established, the ID associating the document with a user receiving the document. The ID is embedded in the pages of the document using the plurality of watermark schemes according to the watermark information. To recover an ID from a document, the pages of the document are analyzed to identify watermark information associated with the document. Embedded watermarks are recovered from the pages using the watermark information.

24 Claims, 5 Drawing Sheets

WATERMARKING DIGITAL DOCUMENTS

CROSS REFERENCE TO RELATED APPLICATIONS

This application is a continuation application of U.S. application Ser. No. 13/080,517, filed Apr. 5, 2011, which is incorporated by reference in its entirety.

TECHNICAL FIELD

The invention generally relates to digital rights management and particularly relates to watermarking textual images.

BACKGROUND

Electronic documents, such as images of scanned books, can be used in a wide variety of electronic devices, such as mobile phones, desktop, laptop, and tablet computers, and dedicated electronic readers. Oftentimes, there is a desire to restrict distribution of such documents for legal or other reasons. For example, a user who buys an electronic book (eBook) may be granted the right to view the book on a limited number of electronic devices, but not to distribute the book to third parties.

Digital watermarking is a form of digital rights management (DRM) used to prevent unauthorized distribution of an electronic document. This type of watermarking inserts information into the document that can be used to assert ownership of the document. The watermark serves to disincentivize a user from improperly distributing the document by allowing the document to be traced back to the original purchaser. Often the watermark is invisible in the sense that it is not perceived by the user.

There are a variety of known schemes for watermarking digital images. For example, the colors within an image can be subtly altered to encode the ownership information. However, these schemes are often unsuitable for use with electronic documents that contain primarily textual images. The low-bit color space (e.g., black and white text) in such images provides fewer avenues for invisibly encoding information within the image. Moreover, the textual nature of the images also makes it easier for a malicious user to identify and remove the watermark.

SUMMARY

The above and other issues are addressed by a computer-implemented method, computer-implemented system and computer-readable storage medium for embedding a watermark in a document having a plurality of pages. An embodiment of the method includes analyzing the plurality of pages of the document to produce watermark information, the watermark information for a page indicating whether the page is suitable for use with one or more of a plurality of watermarking schemes. The method additionally includes establishing an identifier (ID) associating the document with a user receiving the document. The ID is embedded in the plurality of pages of the document using one or more of the plurality of watermark schemes according to the watermark information.

An embodiment of the computer-implemented system for embedding a watermark in a document having a plurality of pages includes a non-transitory computer-readable storage medium having executable program instructions. The instructions include an analysis module configured to analyze the plurality of pages of the document to produce watermark information, the watermark information for a page indicating whether the page is suitable for use with one or more of a plurality of watermarking schemes and an ID module configured to establish an ID associating the document with a user receiving the document. The instructions further include an embedding module configured to embed the ID in the plurality of pages of the document using one or more of the plurality of watermark schemes according to the watermark information, and the system further includes a processor for executing the computer program instructions.

An embodiment of the non-transitory computer-readable storage medium having executable computer program instructions for embedding a watermark in a document having a plurality of pages has instructions including an analysis module configured to analyze the plurality of pages of the document to produce watermark information, the watermark information for a page indicating whether the page is suitable for use with one or more of a plurality of watermarking schemes and an ID module configured to establish an identifier (ID) associating the document with a user receiving the document. The instructions further include an embedding module configured to embed the ID in the plurality of pages of the document using one or more of the plurality of watermark schemes according to the watermark information.

The above and other issues are further addressed by a method for recovering an ID from a document having a plurality of pages with embedded watermarks. An embodiment of the method includes analyzing the plurality of pages of the document to identify watermark information associated with the document and recovering a plurality of embedded watermarks from the plurality of pages of the document using the watermark information. The method further includes decoding the recovered plurality of embedded watermarks using an error correction code to produce the ID.

DETAILED DESCRIPTION

The figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
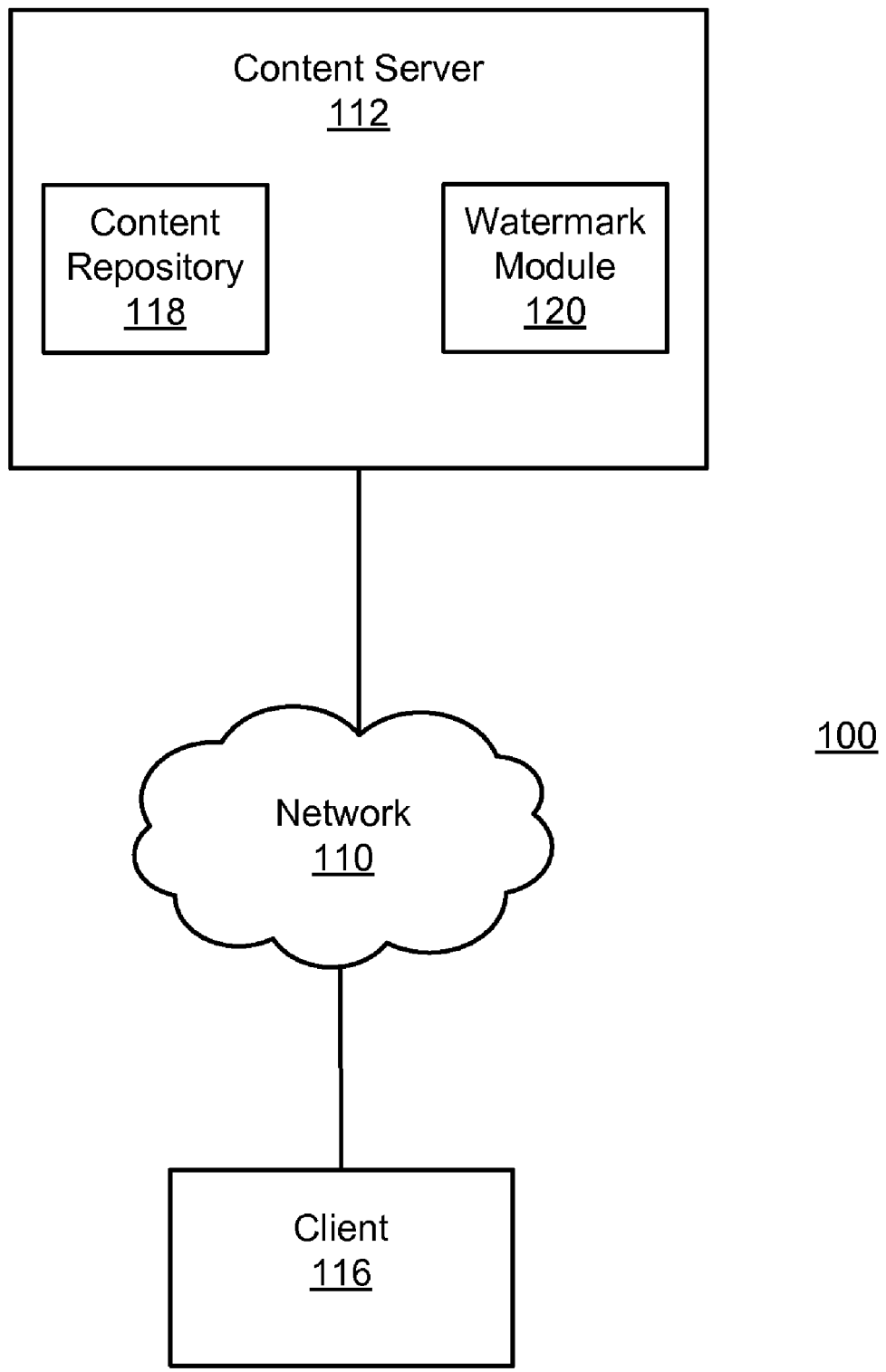
FIG. 1 is a high-level block diagram illustrating an environment for embedding watermarks in digital documents according to one embodiment.

FIG. 1 is a high-level block diagram illustrating an environment 100 for embedding watermarks in digital documents according to one embodiment. As shown, the environment 100 includes a network 110, a content server 112, and a client 116. While only one of each entity is shown in FIG. 1 for clarity, embodiments can have multiple servers 112 and many clients 116.

The network 110 represents the communication pathway between the content server 112 and client 116. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including image data in binary form (e.g. Portable Network Graphics (PNG), the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

The content server 112 serves digital content to the client 116. The content server 112 can be, for example, an electronic commerce ("ecommerce") website operated by a vendor of digital content. The content server 112 can serve the content as part of an ecommerce transaction, where a user of the client 116 purchases the digital content from the vendor. In one embodiment, the content server 112 serves digital documents formed of multiple pages, such as books.

A content repository 118 stores the digital content served by the content server 112. The content repository 118 can hold a variety of different types of content. In one embodiment, the content repository 118 stores content from books, magazines, newspapers, and/or other documents. This content includes textual images: i.e., images of pages of the documents that are primarily composed of text. The page images also have associated metadata and are arranged in a sequence. The metadata describes characteristics of the pages, such as identifying elements that are headers, footers, text blocks, page numbers, titles, chapter names, etc.

The content server 112 associates unique transaction identifiers (IDs) with ecommerce transactions involving users. A transaction ID allows a document purchased in a transaction to be traced back to the user (i.e., purchaser). For example, the transaction ID can identify the user, client 116, content, and/or content server 112 associated with the transaction. The transaction ID can also serve to identify other information associated with the transaction, such as the date upon which the transaction was completed.

A watermark module 120 embeds watermarks containing transaction IDs into documents served by the content server 112. In one embodiment, an embedded watermark is invisible in the sense that the watermark cannot be perceived by the user or other consumer of the document. The watermark module 120 can also recover an embedded ID from a watermarked document. The watermark therefore discourages improper or illegal distribution of the document, since the ID can be recovered from the document and used to identify the user that initially purchased the content.

In one embodiment, the watermark module 120 uses multiple different watermarking schemes to embed watermarks containing the transaction ID into a document. Each watermarking scheme extends the watermark across multiple pages of the document by embedding different portions of the watermark into different pages. The watermark for a particular scheme, and the transaction ID contained within the watermark, can be recovered by extracting the portions of the watermark from the pages of the document. Moreover, the watermarks of the different schemes can be recovered independently. In the embodiments where the document is formed of pages containing textual images, the watermark module 120 analyzes each page to determine the suitable watermarking schemes for that page. The watermark module 120 then embeds watermarks into the page using the suitable schemes. A given page can have multiple watermarks embedded within it using different watermarking schemes. The multiple watermarks make it more difficult for a malicious user to remove the watermarks from the content.

The client 116 is an electronic device used by a user to interact with the content server 112 and/or view documents obtained from the server. The client 116 can be, for example, a mobile phone, desktop, laptop, or tablet computer, or a dedicated electronic reader ("eReader"). As mentioned above, the user and/or client 116 are associated with unique IDs that are provided to the content server 112. For example, the user can use the client 116 to provide the user's ID to the content server 112 as part of the ecommerce transaction to obtain a document. The user's ID, or another ID that can be traced back to the user, is included in the transaction ID embedded in the document to discourage the user from improperly distributing the document.

Figure 2:
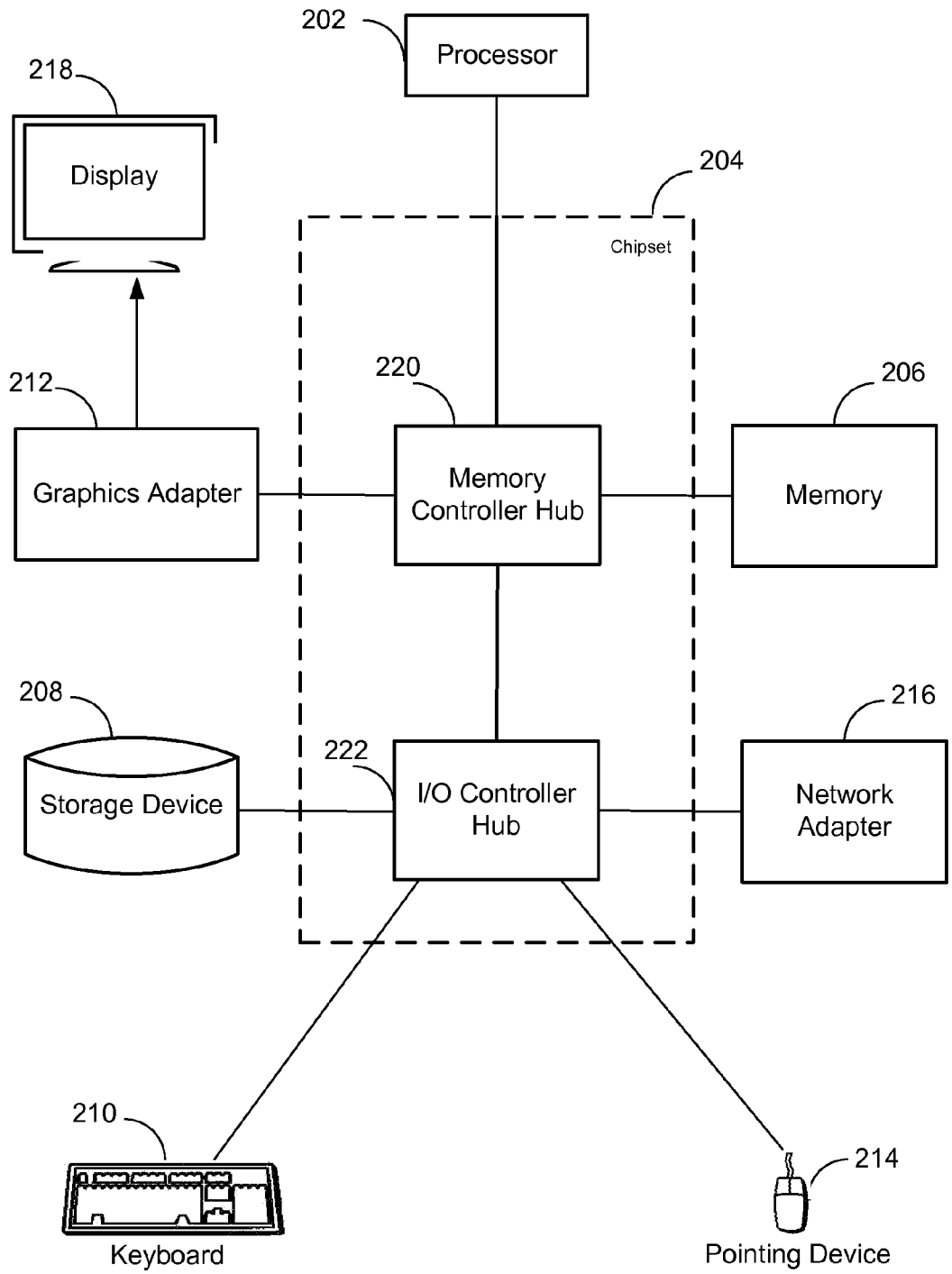
FIG. 2 is a high-level block diagram illustrating an example of a computer for use as a content server and/or a client, in accordance with one embodiment.

FIG. 2 is a high-level block diagram illustrating an example of a computer 200 for use as a content server 112 and/or a client 116, in accordance with one embodiment. Illustrated is at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer 200. The graphics adapter 212 displays images and other information on the display device 218. In some embodiments, the display device 218 includes touch screen capability for receiving user input and selections. The network adapter 216 couples the computer system 200 to the network 101. Some embodiments of the computer 200 have different and/or other components than those shown in FIG. 2. For example, the content server 112 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
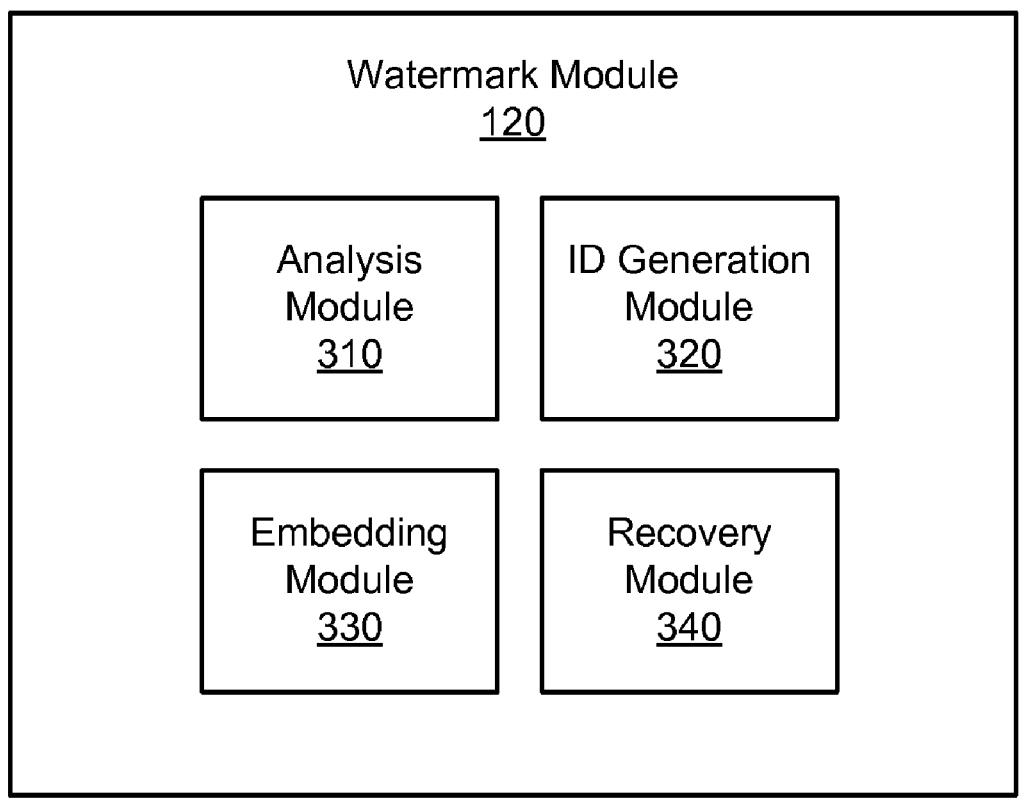
FIG. 3 is a high-level block diagram illustrating a detailed view of the watermark module according to one embodiment.

FIG. 3 is a high-level block diagram illustrating a detailed view of the watermark module 120 according to one embodiment. As shown in FIG. 3, multiple modules are included within the watermark module 120. In some embodiments, the functions are distributed among the modules in a different manner than described herein. Moreover, the functions are performed by other entities in some embodiments, such as by the content repository 118.

An analysis module 310 analyzes the documents stored in the content repository 118 to identify suitable watermarking schemes for the documents. In one embodiment, the analysis module 310 analyzes pages of documents separately, and identifies different suitable schemes for different pages. Thus, for a document having multiple pages of textual images, the analysis module 310 can identify different suitable watermarking schemes for different pages. The analysis module 310 stores the identified suitable watermarking schemes in association with the documents and/or pages so that the suitable schemes for a given page can be quickly determined.

In one embodiment, the watermark module 120 supports three different watermarking schemes: page element shifting; flyspecking; and text warping. Other embodiments can support different and/or additional schemes. The analysis module 310 determines which, if any, of these schemes are suitable for a given page of a document.

Page element shifting involves shifting a page element, such as a page number, by a small amount of pixels in order to embed information. To this end, the analysis module 310 uses metadata associated with the page to identify an element in the document that has enough whitespace around it to tolerate a shift. In one embodiment, the analysis module 310 identifies an element in the header or footer of the document, such as a page number. The analysis module 310 stores the identity of the selected element and the original location of the selected element on each page of the document. If a given page lacks the element, the analysis module 310 flags the page as unsuitable for the page element shifting watermarking scheme.

Flyspecking involves inserting small images called flyspecks at predetermined locations on the pages of documents to embed information. To support flyspecking, the analysis module 310 identifies locations on each page of a document at which a flyspeck can be placed. Depending upon the embodiment, the locations can be the same for each page of the document, or each page can have its own set of locations. Generally, the flyspeck locations are not too close to each other, the page edge, or the text, in order to avoid interference. The analysis module 310 stores the flyspeck locations in association with the page and/or document. If a given page lacks an appropriate number of viable flyspeck locations, the analysis module 310 flags the page as unsuitable for the flyspecking watermarking scheme.

Text warping involves making subtle changes to a block of text on the page to embed information. To support text warping, the analysis module 310 uses metadata associated with the page to identify a block of text. The analysis module 310 determines whether shifting the center of the text block vertically and/or horizontally will be noticeable to a user. The vertical shifting can be performed by increasing/decreasing interline spacing of the text by doubling/deleting a row of pixels. Similarly, horizontal shifting can be performed by increasing/decreasing inter-character spacing of the text by doubling/deleting a column of pixels. The analysis module 310 determines one or more rows or columns of pixels where the doubling/deleting can be performed without making a perceptible difference in the text, such as a line of pixels that does not intersect any text characters, or a line that is all whitespace. The analysis module 310 stores the center position of the text block, and the warp parameters (e.g., a description of the lines to double or delete to imperceptibly warp the text) in association with the page and/or document. If a given page lacks a text block that can be imperceptibly warped, the analysis module 310 flags the page as unsuitable for the text warping watermarking scheme.

The analysis module 310 also maintains ordinal information for each page of a document. The ordinal information indicates the page's ordinal position in a sequence according to each of the watermarking schemes for which the page is suitable. For example, assume the first three pages of a document are unsuitable for flyspecking, and the fourth page is suitable. The fourth page therefore has an ordinal position of "1" in the flyspecking scheme. Since different pages of a document are suitable for different schemes, a given page might have different ordinal positions for each of the three watermarking schemes. In one embodiment the analysis module 310 stores the ordinal information with the scheme suitability information.

The analysis module 310 can perform the document analysis before the document is served to a client 116. For example, the analysis module 310 can analyze a document after it is added to the repository 118 but before the document is provided to a client 116. This pre-processing of the document by the analysis module 310 allows for more efficient watermarking because it decouples the analysis from the subsequent embedding of the watermark.

An ID generation module 320 generates encrypted IDs that are embedded into documents as watermarks. In one embodiment, the ID generation module 320 converts the transaction ID for a document into an encrypted ID, and the encrypted ID is embedded into the document via the watermark. Further, the ID generation module 320 can generate a different encrypted ID for each watermarking scheme used with a document. Thus, each watermarking scheme encodes a different encrypted ID that can be decrypted to produce the transaction ID that identifies the user, client, etc.

An embodiment of the ID generation module 320 generates a 64-bit encrypted ID which is to be embedded across multiple pages of a document. The ID generation module 320 encrypts the transaction ID using an encryption key to produce the encrypted ID. The key is selected to produce a random distribution of bits in the encrypted ID. In one embodiment, the encryption key is different for each watermarking scheme. Thus, the encrypted ID is different for each scheme. The encryption key can also differ based on how many 255-page blocks of the document have been processed (as measured by the pages' ordinals). Accordingly, for a given document, the ID generation module 320 can generate a different encrypted ID for each watermarking scheme for each 255-page block of the document. In an alternative embodiment, the transaction ID is not encrypted.

An embedding module 330 embeds encrypted IDs into documents as watermarks. For each page of a document, the insertion module 330 determines the suitable watermarking schemes identified by the analysis module 310 and then uses those schemes to insert the watermarks. The embedding module 330 treats each watermarking scheme as an independent channel of information, and uses each page's ordinal positions in the respective schemes to determine the portion of the schemes' encrypted IDs to embed into the page. For example, in one embodiment each watermarking scheme can be used to embed three symbols (e.g., bits) of information into a page. If the $11^{th}$ page of the document represents the third ordinal page in the element shifting scheme, the eighth ordinal page in the flyspecking scheme, and the second ordinal page in the text warping scheme, the embedding module 330 embeds the three bits corresponding to the third, eighth, and second portions of the schemes' encrypted IDs into the page using the respective schemes.

In one embodiment, the embedding module 330 embeds the encrypted IDs into the pages using an error correction scheme. The error correction scheme makes the watermarks more robust. In particular, with a watermarking scheme that encodes three bits per page without error correction, the embedding module 330 can embed the entire 64-bit encrypted ID into a sequence of 22 pages of a document. However, embedding the encrypted ID without error correction would make it difficult to recreate the ID if any of the pages contained errors in the watermarks, or if the complete sequence of 22 pages was unavailable. Encoding the encrypted ID with an error correction scheme allows the ID to be recreated even if some of the pages have errors or 22 sequential pages are not available, as long as other pages are available.

In one embodiment, the embedding module 330 encodes the encrypted IDs using two-level Reed-Solomon error correction. For the first level of encoding, the 64-bit encrypted ID is divided into eight 8-bit bytes. These eight bytes are used in an (8, N) 8-bit Reed-Solomon code, where N is the number of pages in the document suitable for the given watermarking scheme. If there are more than 255 pages suited for a single watermarking scheme, the embedding module 330 can either repeat the embedding for the additional pages or embed a different ID in those pages. This first level Reed-Solomon code produces N bytes of data, where ((N−8)/2) errors can be tolerated, or any N−8 erasures restored. In other words, any eight recovered bytes can be used to reconstruct the 64-bit encrypted ID, and if more than eight bytes are available, one byte can be in error for every two additional bytes beyond the original eight. Thus, if 10 bytes are available, one error can be corrected; if 12 bytes are available, two errors can be corrected; if 14 bytes are available, three errors can be corrected; and if 16 bytes are available, four errors can be corrected.

For the second level of encoding, the embedding module 330 encodes each of the N bytes generated using the first encoding level using a (3, 7) Reed-Solomon code. This second encoding spreads the eight bits of each N byte into seven 3-bit groupings. Any three of the 3-bit groupings can be used to reconstruct the original eight bits of the byte. The original eight bits can also be reconstructed with as many as two errors in the seven groupings.

The embedding module 330 embeds the encoded encrypted ID into a document by inserting a 3-bit grouping into each page via the page's suitable watermarking schemes. In one embodiment, the embedding module 330 embeds the 3-bit groupings in an interleaved manner, so that the first page contains the first 3-bit grouping from the first of the N bytes, the second page contains the first 3-bit grouping from the second of the N bytes, etc. Using this technique, a run of 24 sequential pages (measured by the pages' ordinals) will contain three bits from each of eight different ones of the N bytes, enabling reconstruction of the encrypted ID.

The technique used by the embedding module 330 to embed a 3-bit grouping into a page depends upon the page's watermarking scheme. For the page element shifting watermarking scheme, the embedding module 330 shifts the selected element in one of eight directions. Similarly, for the text block warping watermarking scheme, the embedding module 330 shifts the center of the text block in one of eight directions. In both schemes, the direction of the shift indicates the value of the 3-bit grouping.

For the flyspecking watermarking scheme, the embedding module 330 embeds flyspecks at two of five possible flyspeck locations. The locations in which the flyspecks are embedded encode the value of the 3-bit grouping. While it is possible to embed 5 bits in a page using the flyspeck locations, one embodiment of the embedding module 330 uses only 3 bits. If flyspecks are found at more than two locations on the page, this finding is evidence that the flyspecking watermark for the page is invalid.

A recovery module 340 recovers (i.e., extracts) a watermark from a recovered document and determines the transaction ID associated with the document. Typically, the recovery module 340 is used when it is necessary or desirable to determine the provenance of a recovered document. For example, the recovery module 340 can be used to determine the original purchaser of a document recovered from a peer-to-peer network or another location where it might have been subject to unauthorized distribution.

To recover the watermark, the recovery module 340 initially identifies the original document corresponding to the recovered document. This identification can be performed using an automated technique (such as Optical Character Recognition) and/or via manual inspection. For example, the recovery module 340 can compare the pages of the recovered document with pages of documents in the content repository 118 in order to identify the corresponding original document. Once the original document is identified, the recovery module 340 obtains the stored information describing the watermarking for the document. This information includes the ordinal positions of the pages of the document, the locations of the shifted elements, warped text blocks, flyspecks, and encryption keys.

In one embodiment, the recovery module 340 deskews the pages of the recovered document. The deskewing is performed by comparing the text on a recovered page to the page itself, in order to rectify any rotation of the text relative to the page. In addition, the recovery module 340 determines the location of the text block of the recovered page and compares it to the location of the text block in the original page. Together, the deskewing and the text block location comparison describe a coordinate transformation of the recovered page to the original page.

To recover the watermark embedded in a page using page element shifting watermarking, the recovery module 340 searches within the recovered page for the position of the page element. The recovery module 340 determines the displacement of the element in the recovered page relative to the location of the same element in the original page (subject to the coordinate transformation). The direction of the displacement indicates the 3-bit value embedded by the watermark. Similarly, to recover the watermark embedded in the page using flyspecking watermarking, the recovery module 340 determines which of the two flyspeck locations of the recovered document have flyspecks in them. These two locations indicate the 3-bit value embedded by the flyspeck watermark.

To recover the watermark embedded in the page using text warping, the recovery module 340 treats the four edges of the text block in the recovered page as strips. Each strip is projected to make a projection histogram (indicating how much white/black is visible along a pixel row or column of the strip). The same technique is applied to the edges of the text block in the original page. The projection histograms for the original page are then warped in each possible direction, and compared with the projection histograms for the recovered page. The recovery module 340 chooses the best-matching direction, and this direction describes the 3-bit value embedded by the text warping watermark.

For each scheme, the recovery module 340 decodes the recovered stream of 3-bit symbols with the two-level Reed-Solomon scheme used during the embedding process. If detection fails for a given scheme on a given recovered page, the bits for that page are marked as "missing" and the Reed-Solomon decoding process will attempt to recover the missing bits. This decoding process produces the encrypted ID for the recovered document, which the recovery module 340 decrypts to obtain the transaction ID for the document. If the recovery module 340 successfully recovers the transaction ID using multiple watermarking schemes, and/or from multiple 255-page blocks, the recovery module 340 can compare the recovered transaction IDs as a cross-check.

Figure 4:
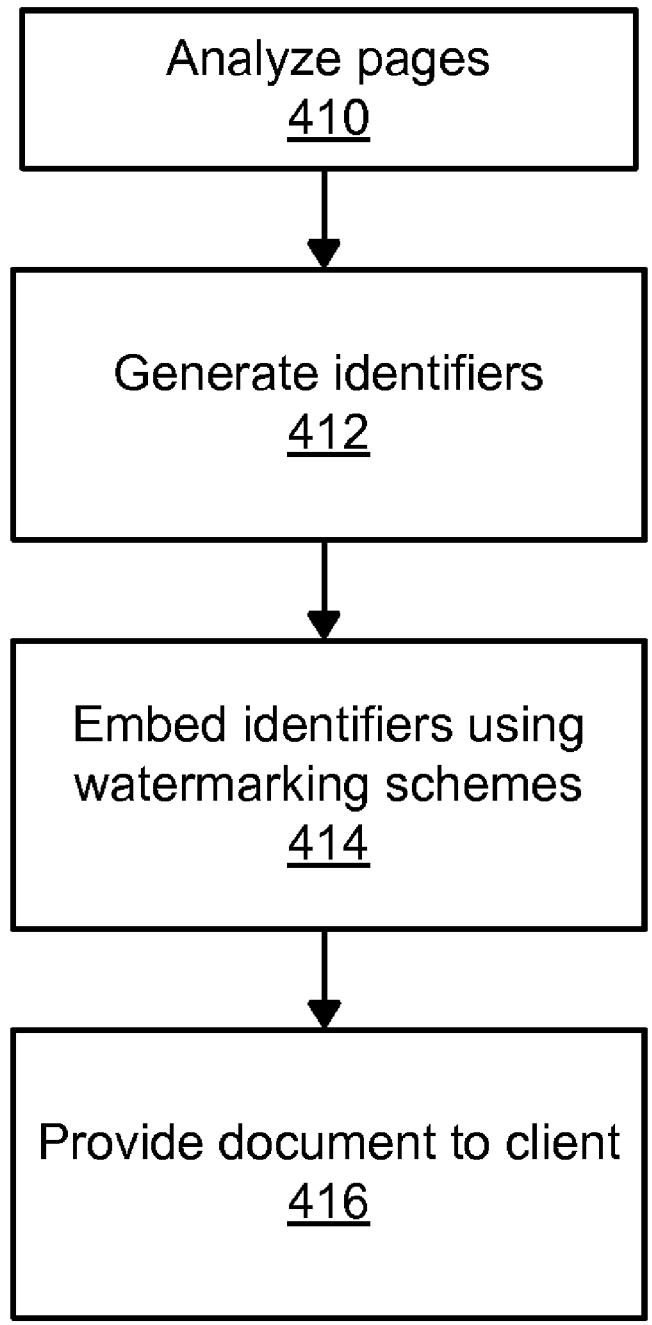
FIG. 4 is a flowchart illustrating a method of embedding a watermark according to one embodiment.

FIG. 4 is a flowchart illustrating a method of embedding a watermark according to one embodiment. While this description ascribes the steps of the method to the watermark module 120, other modules or entities can perform some or all of the steps in other embodiments. In addition, the method can perform the steps in different orders and/or include different steps.

The watermark module 120 analyzes 410 the pages of a document to determine the pages that are suitable for each of multiple watermarking schemes. The watermark module 120 stores watermark information produced by the analysis. The watermark information indicates location information specifying the location of page elements and flyspecks, and ordinal information specifying the ordinals for each page in each scheme.

A user uses a client 116 to purchase a document from the content server 112. The transaction is identified by a transaction ID. The watermark module 120 generates 412 encrypted IDs from the transaction ID. In one embodiment, the watermark module 120 generates a different encrypted ID for each watermarking scheme.

The watermark module 120 embeds 414 the encrypted IDs into the document using the watermarking schemes. In one embodiment, the watermark module 120 uses two-level Reed-Solomon coding and embeds three bits per page per suitable scheme into each page of the document. The watermarked document is provided 416 to the client 116.

Figure 5:
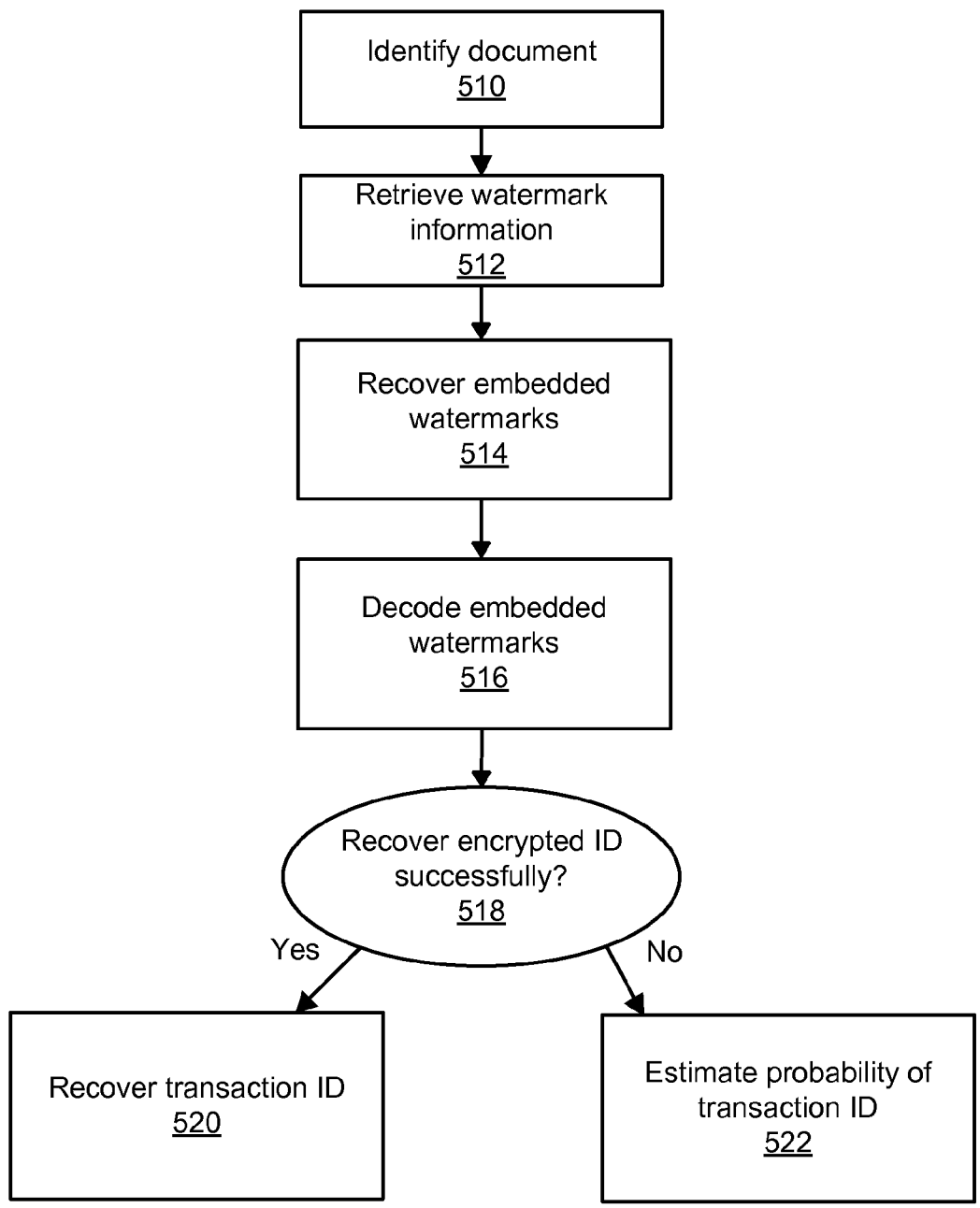
FIG. 5 is a flowchart illustrating a method of recovering a watermark from a document according to one embodiment.

FIG. 5 is a flowchart illustrating a method of recovering a watermark from a document according to one embodiment. While this description ascribes the steps of the method to the recovery module 340, other modules or entities can perform some or all of the steps in other embodiments. In addition, the method can perform the steps in different orders and/or include different steps.

A recovered document includes some, but not necessarily all, of the pages originally in the document. The recovery module 340 uses the pages to identify 510 the original document by, for example, comparing the recovered pages with pages of documents in the content repository 118. Once the document is identified, the recovery module 340 retrieves 512 the watermark information for the document. The recovery module 340 then uses the retrieved information to recover 514 the embedded watermarks from the pages of the document.

The recovery module 340 decodes 516 the recovered watermarks to produce the encrypted IDs for the document. Since the recovered document does not necessarily have all of its original pages, and the pages may have been altered in ways that removed or obscured the watermarks, the recovery module 340 is not necessarily able to recover the three bits of watermark per page per scheme. The recovery module 340 uses the error correction code to attempt reconstruction of the encrypted IDs embedded into the document using each of the watermarking schemes. If 518 the recovery module 340 is able to successfully recover a complete encrypted ID from the recovered document, the recovery module 340 decrypts the encrypted ID to recover 520 the transaction ID for the document.

If 518 the recovery module 340 is unable to successfully recover a complete encrypted ID, an embodiment of the recovery module estimates 522 the probability that the recovered partial ID is associated with a particular transaction. The number of transactions (e.g., user downloads) involving the recovered document is typically only a small subset of the total number of transactions performed by the content server 112. Therefore, the recovery module 340 can identify the transaction IDs for the transactions involving the document, and compare these transaction IDs to the partial ID in order to determine if the partial ID matches any of the (encrypted) transaction IDs for the document.

In one embodiment, the recovery module 340 determines the bits that would have been encoded in the recovered pages of the document based on each of the transaction IDs for the document. Each set of bits produced by a given transaction ID that matches the corresponding bits on a page of the document results in a "vote" for the given transaction ID. The recovery module 340 tallies the votes for each of the transaction IDs, and thus determines a probability that each transaction ID matches the partial recovered ID. If one of the transaction IDs has a significantly higher probability of matching than the other IDs, the recovery module 340 declares that that transaction ID is a match.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for discovering documents sharing common underlying structures in a large collection of documents and processing the documents using the discovered structures. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of embedding a watermark in a document having a plurality of pages, comprising:
   analyzing the plurality of pages of the document to produce watermark information, the watermark information for a page indicating whether the page is suitable for use with two or more of a plurality of watermarking schemes;
   establishing an identifier (ID) associating the document with a user receiving the document; and
   embedding the ID in the plurality of pages of the document using two or more of the plurality of watermark schemes according to the watermark information.

2. The method of claim 1, wherein the watermark information for the page includes ordinal information describing ordinal positions of the page in a sequence for each of the plurality of watermarking schemes for which the page is suitable, and wherein the embedding embeds the ID in the plurality of pages according to the ordinal information.

3. The method of claim 1, wherein analyzing the plurality of pages of the document comprises:
   analyzing the page of the document to determine whether the page is suitable for use with a page element shifting watermarking scheme that embeds the watermark in the page by shifting a page element in a specified direction.

4. The method of claim 3, wherein the page is suitable for use with the page element shifting watermarking scheme and the watermark information describes a location of the page element to be shifted to embed the watermark.

5. The method of claim 1, wherein analyzing the plurality of pages of the document comprises:
   analyzing the page of the document to determine whether the page is suitable for use with a flyspecking watermarking scheme that embeds the watermark in the page by placing flyspeck images at selected ones of a plurality of locations on the page.

6. The method of claim 5, wherein the page is suitable for use with the flyspecking watermarking scheme and the watermark information describes the plurality of locations on the page where flyspeck images can be placed to embed the watermark.

7. The method of claim 1, wherein analyzing the plurality of pages of the document comprises:
   analyzing the page of the document to determine whether the page is suitable for use with a text warping watermarking scheme that embeds the watermark in the page by warping a block of text on the page.

8. The method of claim 7, wherein the page is suitable for use with the text warping watermarking scheme and the watermark information describes warp parameters describing how to warp the block of text to embed the watermark.

9. The method of claim 1, wherein embedding the ID in the plurality of pages of the document comprises:
   generating a plurality of encrypted IDs based at least in part on the ID, each encrypted ID associated with one of the plurality of watermarking schemes; and
   embedding each of the plurality of encrypted IDs in the plurality of pages of the document using the watermarking scheme with which the encrypted ID is associated.

10. The method of claim 1, wherein embedding the ID in the plurality of pages of the document comprises:
    encoding the ID using an error correction code to produce an encoded ID having a sequence of a plurality of symbol groupings; and
    embedding the plurality of symbol groupings in the plurality of pages of the document according to a watermark scheme, the watermark information, and the sequence.

11. The method of claim 1, wherein embedding the ID in the plurality of pages of the document comprises:
    generating a plurality of encrypted IDs based at least in part on the ID, each encrypted ID associated with one of the plurality of watermarking schemes;
    encoding the plurality of encrypted IDs using an error correction code to produce a plurality of encoded IDs each having a sequence of symbol groupings and associated with one of the plurality of watermarking schemes; and
    embedding a symbol grouping of the sequence in the page using the associated watermarking scheme for each of the plurality of watermarking schemes and associated sequence of symbol groupings.

12. A computer-implemented system for embedding a watermark in a document having a plurality of pages, comprising:
    a non-transitory computer-readable storage medium having executable computer program instructions embodied therein comprising:
      an analysis module configured to analyze the plurality of pages of the document to produce watermark information, the watermark information for a page indicating whether the page is suitable for use with two or more of a plurality of watermarking schemes;
      an ID module configured to establish an identifier (ID) associating the document with a user receiving the document; and
      an embedding module configured to embed the ID in the plurality of pages of the document using two or more of the plurality of watermark schemes according to the watermark information; and
    a processor for executing the computer program instructions.

13. The system of claim 12, wherein the watermark information for the page includes ordinal information describing ordinal positions of the page in a sequence for each of the plurality of watermarking schemes for which the page is suitable, and wherein the embedding embeds the ID in the plurality of pages according to the ordinal information.

14. The system of claim 12, wherein embedding the ID in the plurality of pages of the document comprises:
   generating a plurality of encrypted IDs based at least in part on the ID, each encrypted ID associated with one of the plurality of watermarking schemes; and
   embedding each of the plurality of encrypted IDs in the plurality of pages of the document using the watermarking scheme with which the encrypted ID is associated.

15. The system of claim 12, wherein embedding the ID in the plurality of pages of the document comprises:
   encoding the ID using an error correction code to produce an encoded ID having a sequence of a plurality of symbol groupings; and
   embedding the plurality of symbol groupings in the plurality of pages of the document according to a watermark scheme, the watermark information, and the sequence.

16. The system of claim 12, wherein embedding the ID in the plurality of pages of the document comprises:
   generating a plurality of encrypted IDs based at least in part on the ID, each encrypted ID associated with one of the plurality of watermarking schemes;
   encoding the plurality of encrypted IDs using an error correction code to produce a plurality of encoded IDs each having a sequence of symbol groupings and associated with one of the plurality of watermarking schemes; and
   embedding a symbol grouping of the sequence in the page using the associated watermarking scheme for each of the plurality of watermarking schemes and associated sequence of symbol groupings.

17. A non-transitory computer-readable storage medium having executable computer program instructions embodied therein for embedding a watermark in a document having a plurality of pages, the instructions comprising:
   an analysis module configured to analyze the plurality of pages of the document to produce watermark information, the watermark information for a page indicating whether the page is suitable for use with two or more of a plurality of watermarking schemes;
   an ID module configured to establish an identifier (ID) associating the document with a user receiving the document; and
   an embedding module configured to embed the ID in the plurality of pages of the document using two or more of the plurality of watermark schemes according to the watermark information.

18. The computer-readable storage medium of claim 17, wherein the watermark information for the page includes ordinal information describing ordinal positions of the page in a sequence for each of the plurality of watermarking schemes for which the page is suitable, and wherein the embedding embeds the ID in the plurality of pages according to the ordinal information.

19. The computer-readable storage medium of claim 17, wherein embedding the ID in the plurality of pages of the document comprises:
   generating a plurality of encrypted IDs based at least in part on the ID, each encrypted ID associated with one of the plurality of watermarking schemes; and
   embedding each of the plurality of encrypted IDs in the plurality of pages of the document using the watermarking scheme with which the encrypted ID is associated.

20. The computer-readable storage medium of claim 17, wherein embedding the ID in the plurality of pages of the document comprises:
   encoding the ID using an error correction code to produce an encoded ID having a sequence of a plurality of symbol groupings; and
   embedding the plurality of symbol groupings in the plurality of pages of the document according to a watermark scheme, the watermark information, and the sequence.

21. The computer-readable storage medium of claim 17, wherein embedding the ID in the plurality of pages of the document comprises:
   generating a plurality of encrypted IDs based at least in part on the ID, each encrypted ID associated with one of the plurality of watermarking schemes;
   encoding the plurality of encrypted IDs using an error correction code to produce a plurality of encoded IDs each having a sequence of symbol groupings and associated with one of the plurality of watermarking schemes; and
   embedding a symbol grouping of the sequence in the page using the associated watermarking scheme for each of the plurality of watermarking schemes and associated sequence of symbol groupings.

22. A method of recovering an identifier (ID) from a document having a plurality of pages with embedded watermarks, comprising:
   analyzing the plurality of pages of the document to identify watermark information associated with each of the plurality of pages of the document;
   recovering a plurality of embedded watermarks from the plurality of pages of the document using the watermark information; and
   decoding the recovered plurality of embedded watermarks using an error correction code to produce the ID.

23. The method of claim 22, wherein the plurality of embedded watermarks are embedded in a page of the document using a plurality of watermarking schemes and recovering the plurality of embedded watermarks comprises:
   recovering an embedded watermark from the page using each of the plurality of watermarking schemes.

24. The method of claim 22, wherein decoding the recovered plurality of embedded watermarks produces a partial ID, and the decoding further comprises:
   identifying a set of IDs associated with the document, the IDs in the set associated with users that received the document; and
   comparing the IDs in the set with the partial ID to determine if an ID in the set matches the partial ID.

* * * * *